No. 722,197. PATENTED MAR. 3, 1903.
H. C. SCHNEIDER.
MACHINE FOR MAKING JOINTS.
APPLICATION FILED NOV. 4, 1901.
NO MODEL.
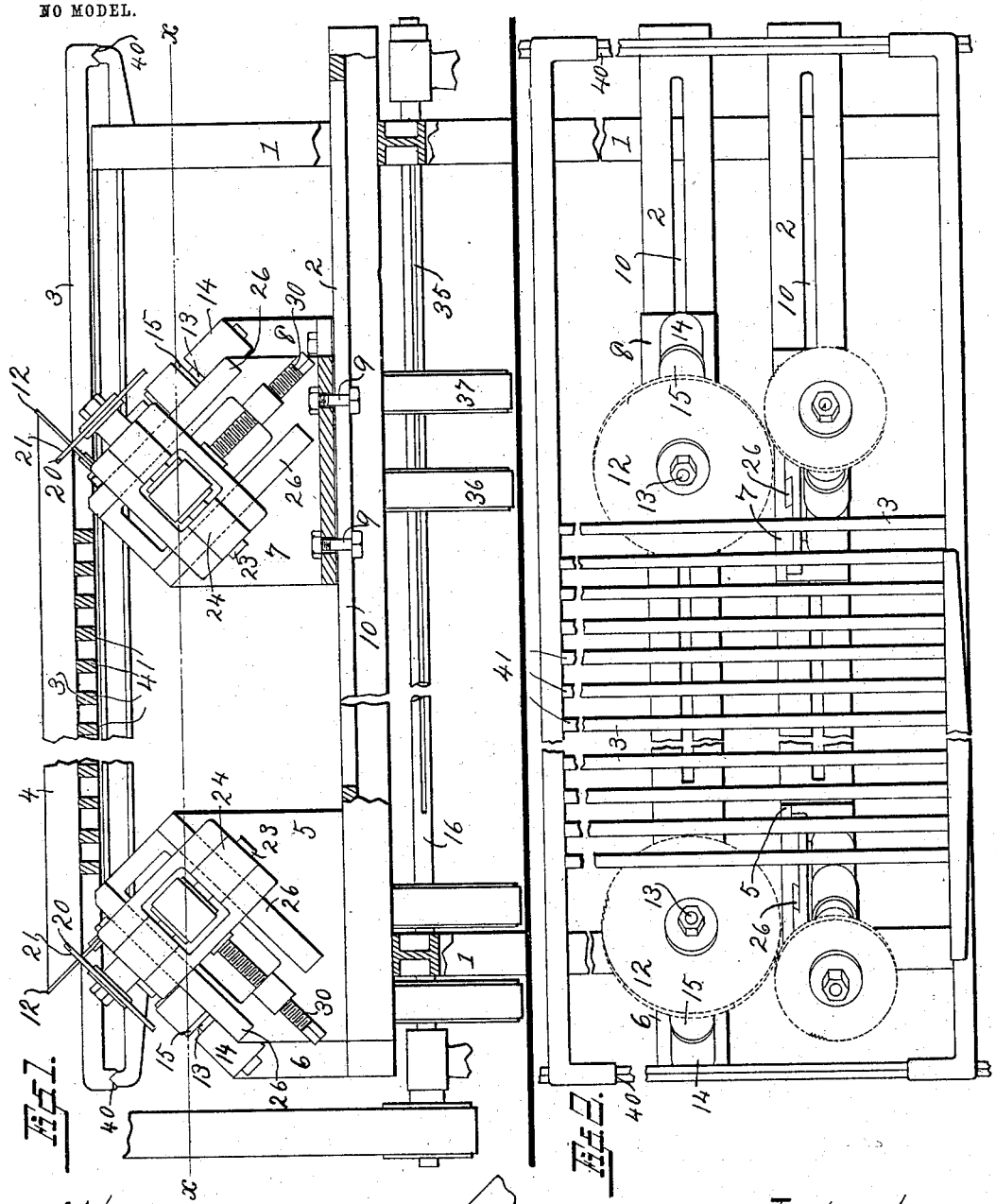
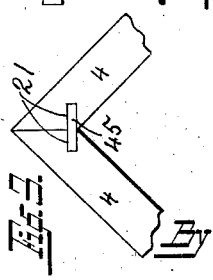
Witnesses:
F. A. Otto
C. L. Roesch
Inventor
Henry C. Schneider
By Erwin & Wheeler
Attorneys.

UNITED STATES PATENT OFFICE.

HENRY C. SCHNEIDER, OF NORTH MILWAUKEE, WISCONSIN.

MACHINE FOR MAKING JOINTS.

SPECIFICATION forming part of Letters Patent No. 722,197, dated March 3, 1903.

Application filed November 4, 1901. Serial No. 81,037. (No model.)

*To all whom it may concern:*

Be it known that I, HENRY C. SCHNEIDER, a citizen of the United States, residing at North Milwaukee, county of Milwaukee, and State of Wisconsin, have invented new and useful Improvements in Mechanism for Manufacturing Furniture-Joints, of which the following is a specification.

My invention relates to improvements in mechanism for manufacturing furniture-joints.

The object of my invention is to provide means for simultaneously cutting and preparing ends of stock or pieces of material in such a manner that when united with other pieces similarly cut and prepared a perfect registry of the opposing faces will be secured as an incident to the union of the parts, the parts being held together by an internal key, whereby I am enabled to dispense with nails or other devices ordinarily inserted through the exterior surfaces of the stock.

In the following description reference is had to the accompanying drawings, in which—

Figure 1 is a side view of my invention, showing parts of the supporting-frame and the table in section. Fig. 2 is a top view of the same. Fig. 3 is a detail showing the form of jointed parts which are prepared through the medium of my invention.

Like parts are identified by the same reference characters throughout the several views.

The frame 1 of my invention is provided with a bed 2, upon which the cutters are mounted, and also with a sliding skeleton platform 3, adapted to support the stock 4 in a position to be operated upon by the cutters. The cutters are adapted to simultaneously operate upon both ends of the stock. In the drawings those at the left hand are supported upon blocks 5 and 6, rigidly connected with the bed 2, while those at the right are supported by similar blocks 7 and 8, which are, however, adjustable upon the bed, being secured thereto by bolts 9, extending through slots 10 in the bed-plate. The cutter 12 consists of an ordinary circular saw having an arbor 13 mounted in suitable bearings 14 on the side of the block 6 in such a manner that the saw stands at an angle of forty-five degrees from a vertical position.

15 is a pulley located on the arbor 13, this pulley being driven from a counter-shaft 16 by means of suitable belting, the counter-shaft being shown in the drawings below its normal position on the line *x x* of Fig. 1. The cutter 20 is supported in a plane at right angles to that of the cutter 12 and is adapted to cut a groove into the stock, as indicated at 21 in Fig. 1. This cutter 20 is supported upon an arbor 23, mounted in suitable bearings 24, which are slidably connected with the block 5, the latter being provided with dovetail guides 26, engaged by the bearing-blocks 24. The adjusting-screw 30 is used to regulate the position of the bearings 24 on the guides 26, whereby the depth of the groove at 21 may be increased or diminished in correspondence with the thickness of the stock.

The cutters mounted upon the sliding blocks 7 and 8 are the same in character as those mounted upon the blocks 5 and 6, respectively; but as the blocks 7 and 8 are adjustable laterally on the bed 2 it is necessary that the driving-pulleys of the respective cutters on these blocks should also be adjustable upon the counter-shaft. I have therefore provided such shaft with a groove 35, in which these driving-pulleys 36 and 37 are splined, so that they can be adjusted in correspondence with the lateral movement of the cutters.

It will of course be understood that the construction of the platform 3 is such that it will not interfere with the adjustment of the cutters, the bearings 40 of such platform being outside of the path of the cutters in any position of adjustment. Bars 41, which, if desired, may be made removable, are used for supporting the stock.

It will be observed that with the described construction both ends of the stock are simultaneously cut, the operation of the cutters 12 and 20 being, however, successive. Where the stock is substantially of the desired length, the cutter 20 is preferably first in operation, the stock then passing to the cutter 12 for the formation of the miter. In this way the danger of splitting out the end of the stock by the cutter 20 is avoided.

The stock cut by mechanism of the described character would necessarily be exactly the same in all cases and when adjusted to form a joint, as shown in Fig. 3, may be readily secured together by a key 45, which when inserted in position in the grooves 21 not only holds the parts of the joint together, but also secures a perfect registry of the meeting faces, the key being glued in position to permanently unite the parts of the joint.

Having thus described my invention, what I claim as new, and desire to secure by Letters Patent, is—

1. The combination of a supporting-frame; a bed provided with parallel slots therein; a set of fixed bearing-blocks secured to the frame; and a set of movable blocks provided with laterally-projecting base-flanges secured to the frame by bolts passing through said parallel slots; saw-arbors mounted in suitable fixed bearings on one of the fixed blocks and one of the movable blocks; a set of diagonally-extending dovetailed flanges on each of the other blocks; saw-arbor bearings movably mounted thereon; saw-arbors mounted in said bearings, substantially at a right angle to those in the fixed bearings of the adjacent blocks; and saws supported from the saw-arbors, with the planes of the adjacent saws crossing each other substantially in the plane of the surface of the stock-carrying table.

2. The combination of a supporting-frame; a bed provided with parallel slots therein; a set of fixed bearing-blocks secured to the frame; a set of movable blocks provided with laterally-projecting base-flanges secured to the frame by bolts passing through said parallel slots; saw-arbors mounted in suitable fixed bearings on one of the fixed blocks and one of the movable blocks; a set of diagonally-extending dovetailed flanges on each of the other blocks; saw-arbor bearings movably mounted thereon; saw-arbors mounted in said bearings, substantially at a right angle to those in the fixed bearings of the adjacent blocks; and saws supported from the saw-arbors, with the planes of the adjacent saws crossing each other substantially in the plane of the surface of the stock-carrying table; together with a sliding stock-carrying table having slide-bearings on each side of the saws, and a stock-carrying central portion between the saws, the bearings of all the saws being below the table, with each saw projecting slightly above the same.

In testimony whereof I affix my signature in the presence of two witnesses.

HENRY C. SCHNEIDER.

Witnesses:
LYMAN G. WHEELER,
LEVERETT C. WHEELER.